United States Patent [19]

Kimizu

[11] Patent Number: 4,797,540

[45] Date of Patent: Jan. 10, 1989

[54] PAYMENT MAKING TERMINAL DEVICE

[75] Inventor: Ryuichi Kimizu, Ootsu, Japan

[73] Assignee: Omron Tateisi Electronics Co., Tyoto, Japan

[21] Appl. No.: 116,778

[22] Filed: Nov. 5, 1987

[30] Foreign Application Priority Data

Nov. 6, 1986 [JP] Japan ............................ 61-264328

[51] Int. Cl.[4] ............................ G06K 15/00

[52] U.S. Cl. ............................ 235/383; 235/319

[58] Field of Search ............................ 235/379, 383

[56] References Cited

U.S. PATENT DOCUMENTS 4,608,487 8/1986 Awane ............................ 235/383

*Primary Examiner*—Harold I. Pitts

*Attorney, Agent, or Firm*—Stevens, Davis, Miller & Mosher

[57] ABSTRACT

The payment making terminal device includes a front side display and a rear side display, so that the operator can easily see the rear side display on which operation guidance for a customer is being displayed. Therefore, she can give an exact device to the customer without looking at the front side of the terminal device on which a customer's secret number is being displayed.

3 Claims, 4 Drawing Sheets

PAYMENT MAKING TERMINAL DEVICE

BACKGROUND OF THE INVENTION

1. Field of the Invention

The present invention relates to a payment making terminal device, and more specifically to a payment making terminal device which can executes a payment when an operator enters data related to commodities purchased by a customer in the registration processing device and thereafter the customer can make a payment by entering his account number or a card data. The commodities include services offered to the customer.

2. Description of the Prior Art

In conventional payment making terminal device, a customer can make a payment by entering account number data or a card data. For the convenience of the customer's entry of his account number data or his card data, usually the terminal device is provided with a guidance display section. In the conventional payment making terminal device, however, since customers vary from the young to the old or when customers are inexperienced in operation of the terminal device, customers are often confused in the key operation.

Therefore, the clerk (operator) must give the customer advice concerning the operation procedure by looking at the payment making terminal device now being operated by the customer in order to know why the customer is confused. However, when the customer makes a payment on the basis of a credit card, his secret number is entered and being displayed in the terminal device, there exists a problem in that the customer's secret number is known by the operator. On the other side, on the operator side, it is troublesome to look at the payment making terminal device whenever the customer cannot operate the device smoothly.

SUMMARY OF THE INVENTION

With these problems in mind, therefore, it is the primary object of the present invention to provide a payment making terminal device provided with another operation guidance display section on the rear side thereof so that an operator can know the present operation status without looking at the front operation surface of the terminnal device.

To achieve the above-mentioned object, a payment making terminal device, which is connected to a registration processing device, for making a payment when an operator enters data related to commodities purchased by a customer to the registration processing device and then the customer operates keys, comprises first displaying means, disposed on a front surface of the device so as to display operation guidance to the customer, and second displaying means, disposed on a rear surface of the device so as to display similar operation guidance to the operator.

In the payment making terminal device of the present invention, since the operation guidance for the customer who operates the device is simultaneously displayed on the second displaying means disposed on the rear side thereof, the operator can see the second displaying means and can quickly know the non-smooth operation an inexperienced status of customer so that she or he can assist the customer without looking at the front side of the payment making terminal device.

Figure 3:
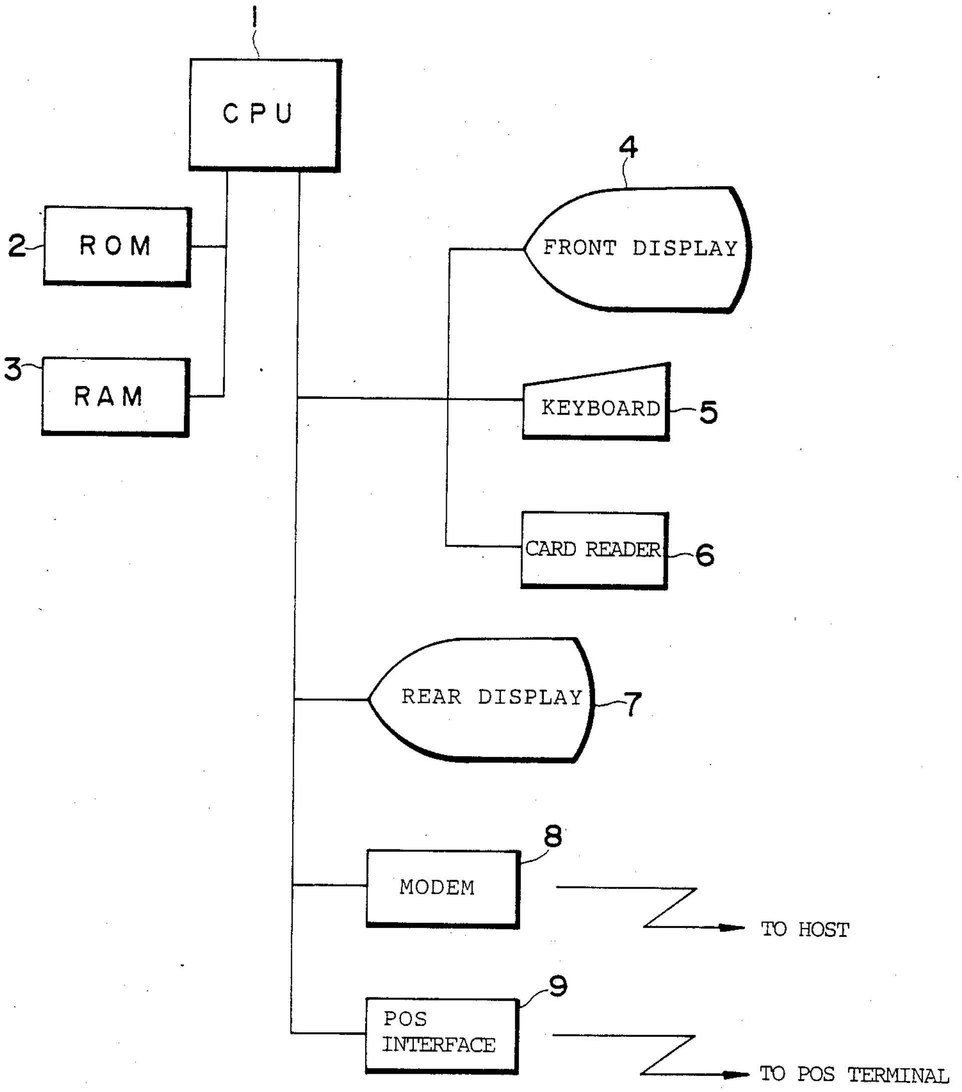
Figure 4:
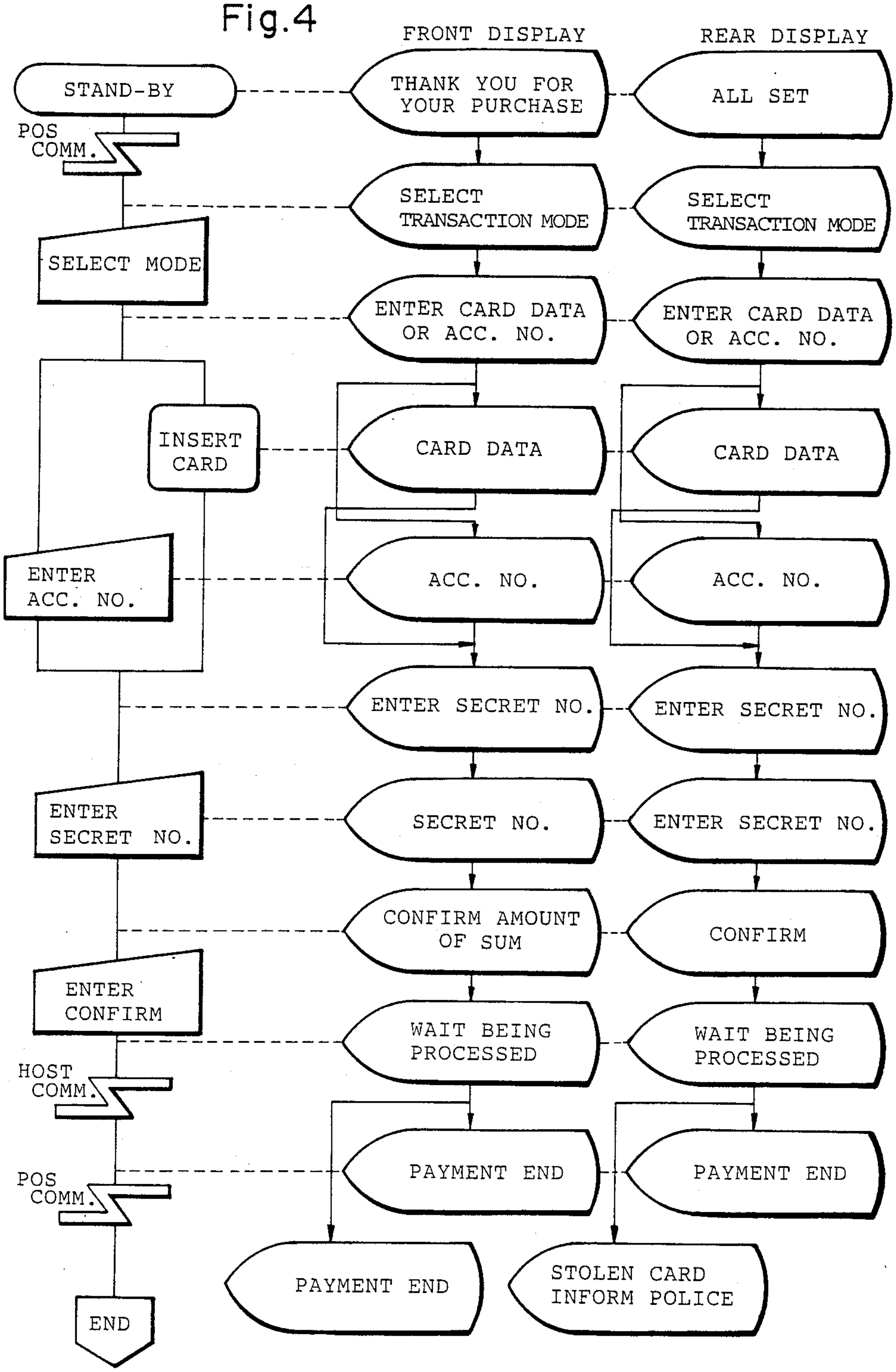

FIG. *2a* is a perspective view showing the front side of an embodiment of the present invention;

FIG. *2b* is a perspective view showing the rear side thereof;

FIG. 3 is a block diagram of an embodiment of the present invention;

FIG. 4 is a flow chart for assistance in explaining the operation of the embodiment of the present invention.

DETAILED DESCRIPTION OF THE PREFERRED EMBODIMENTS

Figure 1:
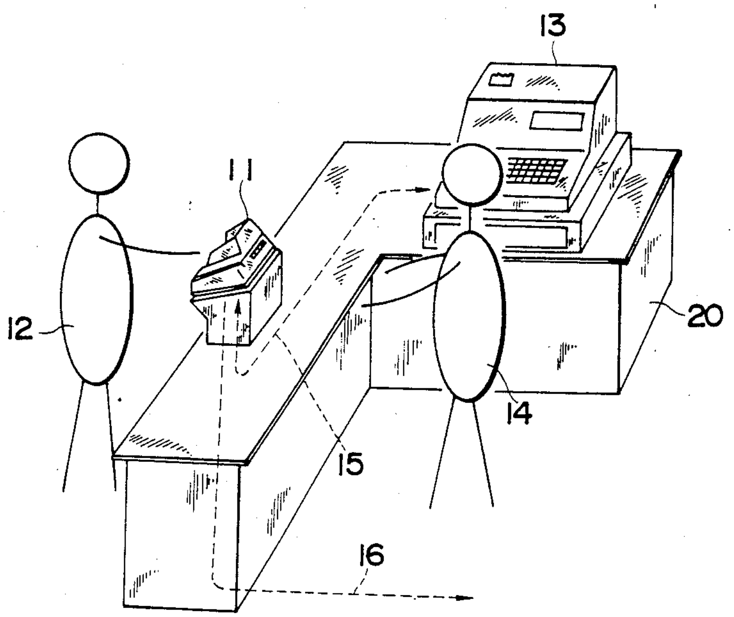
FIG. 1 is an illustration showing the state where the payment making terminal device of the present invention is equipped in a store.
Figure 2A:
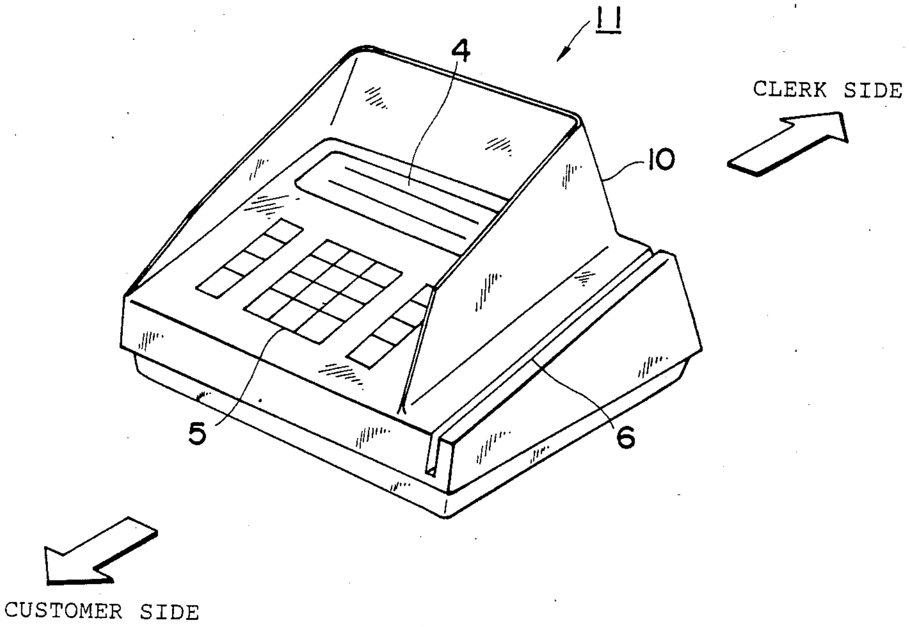
Figure 2B:
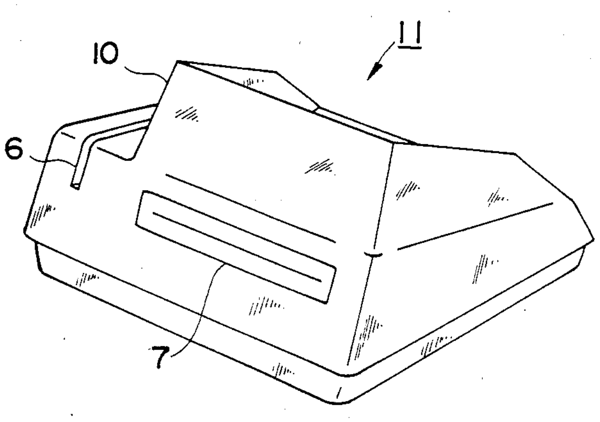

A payment making terminal device of the present invention will be described with reference to FIG. 1, in which the device is shown in the state where equipped in a store. In the drawing, a POS (point of sales) terminal device (e.g. an electronic cash register) 13 serving as a registration processing device operated by an operator or a clerk 14 and a payment making terminal device 11 operated by a customer 12 are mounted separately on an L-shaped counter 20. The payment making terminal device 11 and the POS terminal device 13 are electrically connected to each other via a POS communication line 15, and further the payment making terminal device 11 is connected to a host computer (not shown) via a HOST communication line 16.

An example of the system for making payments comprising an electronic cash register and a payment making terminal device is given in U.S. Pat. No. 4,678,895.

FIG. *2a* is a perspective view obtained when an embodiment of the present invention is seen from the front thereof; while FIG. *2b* is another perspective view when seen from the back thereof.

In FIGS. *2a* and *2b*, the payment making terminal device 11 is installed in such a way that the front operation surface side is directed to a customer and the back side is directed to an operator of a store. A front side display section 4 (first displaying means), a keyboard 5 and a card reader 6 are arranged on the front side of the device 11, while a rear side display section 7 (second displaying means) is disposed on the rear side thereof. The front side display section 4 serves to display operation guidance as to the key board 5 and the card reader 6 for the customer.

The keyboard 5 is used to input an account number data, a secret number, etc., and the card reader 6 reads various data recorded on a credit card. The same or similar operation guidance as displayed in the front side display section 4 is displayed also in the rear side display section 7. Therefore, the operator can see the operation guidance displayed in this rear side display section 7 and thus can know how the customer operates the device 11 now. Further, the front side display section 4 is enclosed by an enclosure 10 to prevent data entered by a customer for payment from being seen by other customers or the operator.

FIG. 3 is a schematic block diagram of the embodiment of the present invention. In FIG. 3, the payment making terminal device 11 comprises a CPU 1, ROM 2, RAM 3, front side display section 4, keyboard 5, card reader 6, rear side display section 7, modem 8, and POS (point of sales) interface 9. The CPU 1 implements payment making processing in accordance with a program stored in the ROM 2. The RAM 3 stores data registered through the POS terminal device 13 shown in FIG. 1. The modem 8 transfers data between the CPU 1 and the host computer. The POS interface 9 transfers data between the CPU 1 and the POS terminal device 13.

FIG. 4 is a flowchart for assistance in explaining the operation of an embodiment of the present invention. With reference to FIGS. 1 to 4, the operation of the embodiment of the present invention will be described hereinbelow.

The payment making terminal device 11 stands by until payment making transaction starts through the POS terminal device 13. That is to say, the operator 14 enters in sequence data related to commodities purchased by the customer 12 through the POS terminal device 13. After all the data related to these commodities have been inputted, the operator effects an add-up operation. Therefore, the POS terminal device 13 transfers a sum of money payable to the payment making terminal device 11 via a POS communication line 15. The payment making terminal device 11 stores the sum payable transferred through the POS communication line 15 and the POS interface 9 in the RAM 3. The CPU 1 requests the customer 12 to select a transaction mode on both the front side display section 4 and the rear side display section 7. Here, the transaction modes are shopping payment, cash delivery, shopping payment and cash delivery, cash deposit, etc.

The customer 12 operates a keyboard 5 to select a transaction mode in accordance with a selection guidance of the transaction mode displayed on the front side display section 4. Once a transaction mode has been selected, CPU 1 indicates on the front side display section 4 and the rear side display section 7 that the suctomer 12 should enter card data through the card reader 6 or an account number data through the keyboard 5. In accordance with the display, the customer 12 enters an account number data through the keyboard 5 or a credit card data through the card reader 6. The account number data entered through the keyboard 5 or the credit card data read through the card reader 6 are given to the CPU 1.

After card data or account number data have been entered, the CPU 1 indicates on the front side display section 4 and the rear side display section 7 that the customer 12 should enter a secret number. When the customer 12 enters a secret number through the keyboard 5, the CPU 1 displays the entered secret number only on the front side display section 4, while displaying the entry operation guidance on both the front side display section 4 and the rear side display section 7. That is to say, since the secret number is not displayed on the rear side display section 7, the secret number is never known by the operator 14.

Once the secret number is entered, CPU 1 displays an amount of money payable transferred from the POS terminal device 13 and stored in the RAM 3 only on the front side display section 4 and displays the confirmation operation guidance on both the front side display section 4 and the rear side display section 7 to request the customer 12 to confirm the total sum. When the customer 12 depressed a key to confirm the sum payable, CPU 1 executes a payment making processing in conjunction with the host computer via the modem 8 and the HOST communication line 16. The CPU 1 receives a payment making completion message from the host computer. If no problem arises with respect to the payment making is completed is displayed on the front side display section 4 and the rear side display section 7. In case there exists a problem with respect to the payment making processing due to a stolen credit card, for instance, a message indicating that the normal transaction has been completed is display on the front side display unit 4, but a message indicating that the used card is a stolen card is displayed on the rear side display unit 7 for the countermeasure. For instance, a message such that in case of a stolen card, inform the police of the matter is displayed for the operator. When the payment making processing has been completed in conjunction with the host computer, the CPU 1 of the payment making terminal device 11 transmits a payment making completion message to the POS terminal device 13, thus completing the payment making processings.

In the above-mentioned operations, when a customer inexperienced in handling the payment making terminal device operates the terminal device, the following problems may arise: the customer does not know how to select the mode in the transaction mode selection step; how to insert a card or, if he knows the way of card insertion, what to do in case of card read error (although an error information and the entry operation guidance are both displayed) in the card insertion step, which key to be depressed after the number has been entered in the account number entry step and the secret number entry step, where "the confirmation key" is located in the payment making amount confirmation entry step, etc.

In every case, since the operator 14 can know what kind of entry should be entered by the customer 12 through the rear side display section 7, she or he can give the customer exact advice without looking at the front side display section 4 or without asking the customer what is the matter with him.

Further, if there exists a criminal problem with the payment making processing, since the criminal problem is displayed only on the rear side display section 7, it is possible to find and prevent a crime. Further, since the payment making message from the host computer is not directly displayed for the customer 12, it is possible to keep a favorable impression to the store.

As described above, according to the present invention, since the second displaying means is provided in the rear side of the payment making terminal device so that the operator can see the same or similar operation guidance as for a customer, the operator can give exact advice to the customer when the customer is having trouble operating terminal device 11 without looking at the front side of the payment making terminal device, on the basis of the display contents on the rear side second display means.

What is claimed is:

1. A payment making terminal device electrically connected to a registration processing device, for making payment when an operator enters data related to commodities purchased by a customer to the registration processing device and then the customer operates keys of the payment making terminal device, which comprises:

first displaying means, disposed on a front surface of the device so as to display to the customer, operation guidance for the customer and second displaying means, disposed on a rear surface of the device so as to display to the operator, the operation guidance.

2. The payment making terminal device as set forth in claim 1, wherein a customer's secret number is displayed on only the first displaying means.

3. The payment making terminal device as set forth in claim 1, wherein in case of a stolen card, this is indicated on only the second displaying means.

* * * * *